United States Patent [19]

Hashimoto

[11] Patent Number: 4,507,368
[45] Date of Patent: Mar. 26, 1985

[54] BATTERY DEVICE

[75] Inventor: Hisashi Hashimoto, Sumoto, Japan

[73] Assignee: Sanyo Electric Co., Ltd., Japan

[21] Appl. No.: 632,689

[22] Filed: Jul. 23, 1984

Related U.S. Application Data

[63] Continuation of Ser. No. 510,153, Jun. 30, 1983, abandoned, which is a continuation of Ser. No. 317,073, Nov. 2, 1981, abandoned.

[30] Foreign Application Priority Data

Nov. 14, 1980 [JP] Japan .............. 55-163775[U]

[51] Int. Cl.$^3$ .................. H01M 2/10; H01M 6/50
[52] U.S. Cl. ................................. 429/62; 429/94
[58] Field of Search ............. 429/7, 61, 62, 178, 429/123, 1, 94

[56] References Cited

U.S. PATENT DOCUMENTS

| | | | |
|---|---|---|---|
| 2,246,110 | 6/1941 | Sidnell | 429/178 |
| 3,518,524 | 6/1970 | Roszyk | 320/36 |
| 3,794,525 | 2/1974 | Kaye | 429/159 |
| 4,121,017 | 10/1978 | Dougherty et al. | 429/7 |
| 4,123,598 | 10/1978 | Hammel | 429/178 |
| 4,209,571 | 6/1980 | Bessett et al. | 429/7 |
| 4,217,400 | 8/1980 | Leffingwell | 429/7 |
| 4,224,383 | 9/1980 | Taylor | 429/7 |
| 4,247,603 | 1/1981 | Leffingwell et al. | 429/1 |
| 4,289,836 | 9/1981 | Lemelson | 429/93 |

FOREIGN PATENT DOCUMENTS 1536143  12/1978  United Kingdom ............. 429/7

Primary Examiner—Donald L. Walton
Attorney, Agent, or Firm—Darby & Darby

[57] ABSTRACT

A battery device for use as a power source for portable electric or electronic appliances. The battery device includes a case (28) which defines a closed space and which is made of hardly flammable and shock-resistant synthetic resin, and secondary batteries (35, 37) and a breaker (45) are disposed in the case. The breaker is connected to the electrodes of the secondary batteries and placed in a charge-discharge circuit including electrically conductive lines and detects the current in the charge-discharge circuit and the environmental temperature in the case, the arrangement being such that when the current or the environmental temperature exceeds a predetermined value, it cuts off the charge-discharge circuit and when the current or the environmental temperature falls below the predetermined value, it is automatically restored to its original state.

16 Claims, 15 Drawing Figures

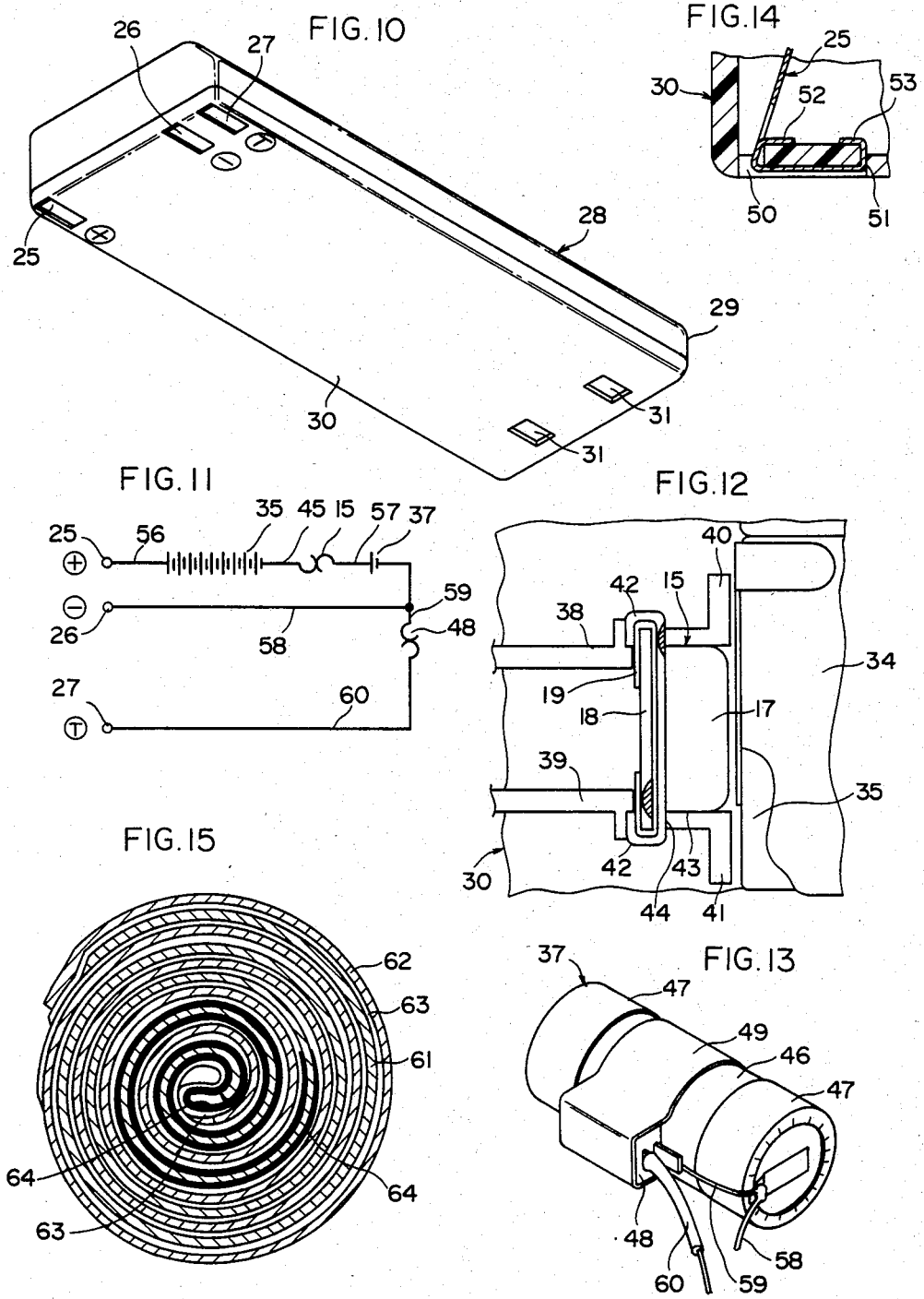

BATTERY DEVICE

This application is a continuation of Ser. No. 510,153 filed June 30, 1983 now abandoned which is in turn a continuation of file 317,073 filed Nov. 2, 1981 now abandoned.

BACKGROUND OF THE INVENTION

1. Field of the Invention

This invention relates to a battery device and more particularly to a battery device having battery-protective parts connected to secondary batteries, such as nickel cadmium batteries or lead batteries.

2. Description of the Prior Art

FIG. 1 is a perspective view of a prior art battery device which is of interest to this invention, said battery device being shown with an upper case member 1 separated from a lower case member 2. The upper and lower case members 1 and 2, when fitted together, form a case. The lower case member 2 receives two cylindrical battery assemblies 3 and 4 arranged side by side in contact with each other. The battery assemblies 3 and 4 each comprise a plurality of unit batteries 5, such as cylindrical nickel cadmium batteries. The unit batteries 5 are connected in series with each other and covered with a paper tube 6, forming the mechanically integrated battery assemblies 3 and 4. The battery assemblies 3 and 4 are connected in series with each other by a connector plate 7. The series-connected battery assemblies 3 and 4 have lead wires 8 and 9 connected to the cathode and anode thereof, respectively. The lead wires 8 and 9 are led out of the case through a notch 10 formed in the upper case member 1. The front ends of the lead wires 8 and 9 are formed with a connector, not shown.

One lead wire, e.g., 8, has a temperature fuse 11 and a current fuse 12 placed therein as battery-protective parts. The temperature fuse 11 protects the batteries from thermal influences due to a sharp increase in battery temperature during charging caused as by overcharge. Thus, it detects a predetermined temperature, whereupon it cuts off the circuit. The current fuse 12 protects the batteries from thermal influences due to an abnormal temperature rise caused by a large current flowing through the circuit as when a short circuit takes place in the external circuit. Thus, it detects a predetermined current, whereupon it cuts off the circuit. In this manner, protection of the batteries from thermal influences is provided in two ways, temperature detection and current detection.

In the device shown in FIG. 1, however, once an abnormality takes place, the circuit remains broken and it is necessary to replace the battery-protective part each time before the device can be used again. With this taken into account, it is seen that the arrangement must be such as to allow easy access to the temperature fuse 11 and current fuse 12. To this end, an arrangement is employed as an example wherein the upper case member 1 is formed with a window 13 to provide easy access to the fuses 11 and 12. This window 13 is normally closed by a label 14, which will be removed when necessary. Alternatively, if the upper case member 1 is secured to the lower case member 2 by screws (not shown) so that the upper case member 1 can be separated from the lower case member 2 as needed, easy access to the fuses 11 and 12 can be gained. Even if these arrangements are employed, however, it is very troublesome to replace the battery-protective parts and many manufacturers and sellers would not like to assume the duty of maintenance thereof.

Another prior art technique is U.S. Pat. No. 3,518,524 "Cordless Electric Appliance" granted to Roszyk. This patent discloses an arrangement comprising a thermostat switch mounted on the sheath of a secondary battery; thereby detecting heat generation in a charging period to cut off the charging current in the charging period, automatically continuing and discontinuing the charging operation. This thermostat switch, however, is absolutely for the purpose of charge control, never serving as a safety device when some failure occurs. More particularly, in order to provide such safety device, a device for detecting the battery temperature and current must be provided not only in the charging circuit but also in the discharging circuit.

SUMMARY OF THE INVENTION

This invention advantageously solves the prior art drawbacks described above.

In brief, the invention is a battery device using a self-restoring breaker as a protective part for a secondary battery. The secondary battery is received in a case which is composed of an upper case member and a lower case member rigidly put together and which defines a closed space for the secondary battery. The device includes a charge-discharge circuit connected to the electrodes of the secondary battery and including an electrically conductive lines led out of the case, and said breaker is placed in said charge-discharge circuit. The breaker detects the current in the charge-discharge circuit and the environmental temperature in the case to cut off the charge-discharge circuit when the current or the environmental temperature exceeds a predetermined value. According to this invention, since the self-restoring breaker is used, even if the circuit is once cut off, there is no need to replace such part and this is very convenient in handling. Further, since the breaker of this invention operates by detecting the current and the environmental temperature, there is no need to use a temperature fuse and a current fuse as in the prior art device of FIG. 1, and the number of parts can be reduced. The detection by the breaker of the environmental temperature in the case defining the closed space is not influenced by the atmosphere outside the case, so that highly reliable detection of temperature is possible.

In a preferred embodiment of this invention, the cut-off temperature of the breaker set with respect to the environmental temperature is selected so that it is lower than the temperature at which the material of the case loses its configurational stability. As a result, it is also possible to protect the case itself. Besides the breaker, a charge control thermostat is provided in connection with the secondary battery. The cut-off set temperature of this thermostat is selected so that it is lower than the temperature set for the breaker to cut off with respect to the environmental temperature, thus providing a dual safety measure. As secondary battery, there may sometimes be included a plurality of unit batteries, in which case the breaker and the thermostat are disposed close to separate unit batteries. This arrangement minimizes the possibility of the breaker or the thermostat malfunctioning owing to a failure in a unit battery, thus providing a highly reliable safety device. Further, due consideration is given to the positioning of the unit batteries in the case so as to avoid waste of space in the case. This reduces the size of the case to provide a battery device handy to carry. The material and construction of the case are also given consideration to provide for handiness. In a preferred embodiment, the case is made of hardly flammable and shock-resistant synthetic resin, and the upper and lower case members are firmly welded together by ultrasonic waves.

Accordingly, a principal object of the invention is to provide a battery device free from troublesomeness of maintenance.

Another object of the invention is to provide a battery device requiring a smaller number of parts.

A further object of the invention is to provide a battery device which is reliable in point of safety.

Still a further object of the invention is to provide a packaging construction for a compact battery device handy to carry.

These objects and other objects, features, aspects and advantages of the present invention will become more apparent from the following detailed description of the present invention when taken in conjunction with the accompanying drawings.

BRIEF DESCRIPTION OF THE DRAWINGS

FIG. 10 is a perspective view of the FIG. 8 embodiment as seen from below;

FIG. 11 is a wiring diagram for the FIG. 8 embodiment;

FIG. 12 is an enlarged plan view showing the region where a breaker in the FIG. 8 embodiment is attached;

FIG. 13 is an enlarged perspective view showing the region where a thermostat in the FIG. 8 embodiment is attached;

FIG. 14 is an enlarged sectional view showing the region where terminals in FIG. 8 embodiment are attached; and FIG. 15 is a cross-sectional view of a spiral electrode arrangement in a preferred embodiment of a secondary battery applied to the invention.

DESCRIPTION OF THE PREFERRED EMBODIMENTS

Figure 1:
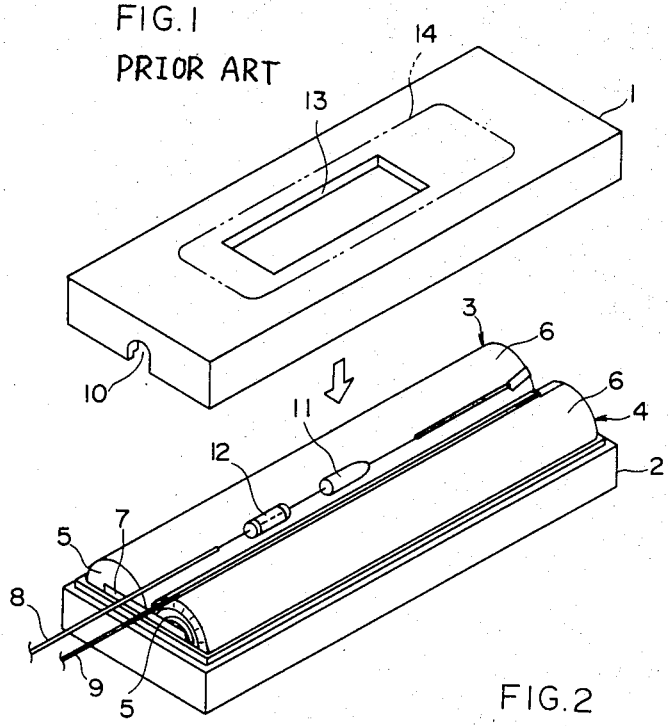
FIG. 1 shows a prior art battery device which is of interest to this invention.
Figure 2:
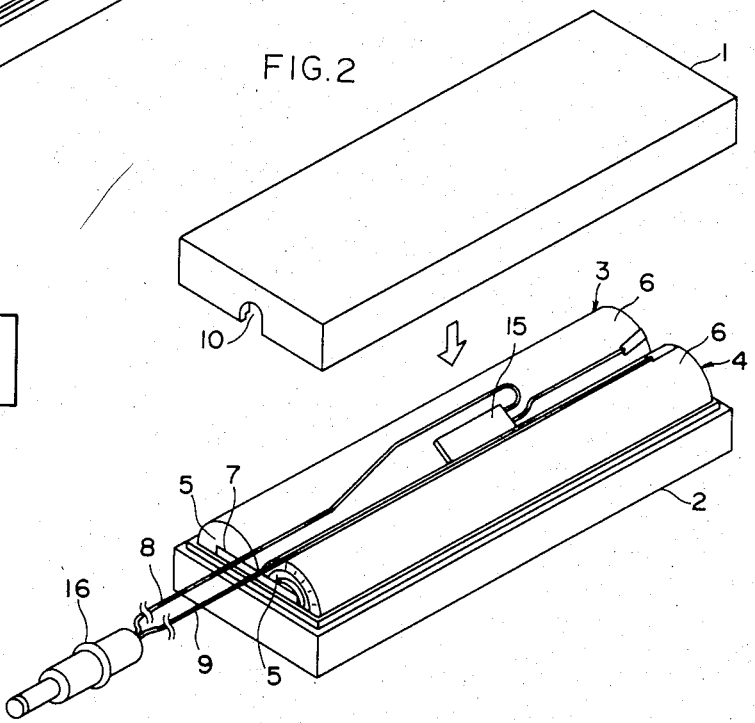
FIG. 2 is a perspective view of an embodiment of this invention, with an upper case member and a lower case member being shown separated from each other.

Referring to FIG. 2, there is shown a device of substantially the same design as a prior art device shown in FIG. 1. The major difference therebetween is that the temperature fuse 11 and the current fuse 12 in FIG. 1 are replaced by a self-restoring breaker 15 in FIG. 2. Further, the upper case member 1 is not formed with a window 13. The upper and lower case members 1 and 2 can be permanently joined together by ultrasonic welding, heat sealing, adhesive bonding or the like. Other components are the same as those shown in FIG. 1 and like components are given like reference numerals to avoid a repetition of description.

Figure 3:
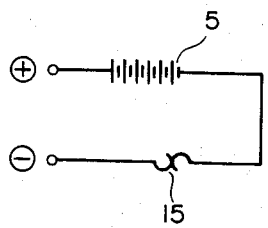
FIG. 3 is a wiring diagram for the embodiment shown in FIG. 2.

Battery assemblies 3 and 4 each comprise unit batteries 5, e.g., 3 in number, so that the wiring diagram for the device of FIG. 2 is as shown in FIG. 3. There would be no particular need to describe FIG. 3. The front ends of lead wires 8 and 9 have a connector 16 attached thereto for connection to electric or electronic appliances which operate with this battery device as a power source or to a charging device. The UL Standards require that the upper and lower case members 1 and 2 be made of hardly flammable and shock-resistant material. In this embodiment, hardly-flammable ABS resin is used to meet such requirement. As for heat-resistance, the material of the case must be selected with consideration given to the background in which such battery device is used. For example, there may be a possibility that such battery device is left to stand in a closed automobile, in which case the temperature in the car can reach as high as 80° C. in midsummer. Therefore, the case material is required to have sufficient heat-resistance to endure such high temperature. Further, corresponding to this temperature, the temperature at which the breaker 15 is cut off with respect to the environmental temperature is set. Stated concretely, this set temperature is, e.g., 80±5° C. It is preferable that the set temperature for the breaker be lower than the temperature at which the material of the case melts or, if not melt, deforms, i.e., the temperature at which the case loses its configurational stability.

Figure 4:
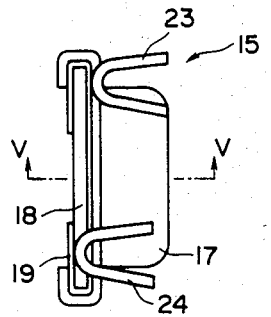
FIG. 4 is a plan view of an example of a self-restoring breaker applied to the invention.
Figure 5:
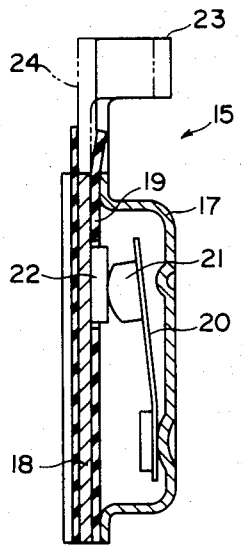
FIG. 5 is a sectional view taken along the line V—V of FIG. 4.

Referring to FIGS. 4 and 5, the breaker 15 comprises a metal can 17 and a metal plate 18. The end of the metal can 17 is curled to fix the metal plate 18 in position. A gasket 19 made of insulating material is interposed between the metal can 17 and the metal plate 18, so that the metal can 17 and metal plate 18 are electrically insulated from each other. One end of a bimetal 20 is fixed to the metal can 17. The other end of the bimetal 20 is formed with a movable contact 21. A fixed contact 22 associated with the movable contact 21 is attached to the metal plate 18 and extends through the gasket 19 to face to the movable contact 21. One terminal 23 extends integrally from the metal can 17, while the other terminal 24 extends integrally from the metal plate 18.

Such breaker 15 operates in response both to temperature and to current. More particularly, the bimetal 20 is made of a material which generates heat when subjected to overcurrent. Therefore, the bimetal 20 normally having the movable contact 21 kept in contact with the fixed contact 22 will flex by heat generation due to overcurrent and also by a sharp rise in ambient temperature to thereby separate the movable contact 21 from the fixed contact 22.

Figure 6:
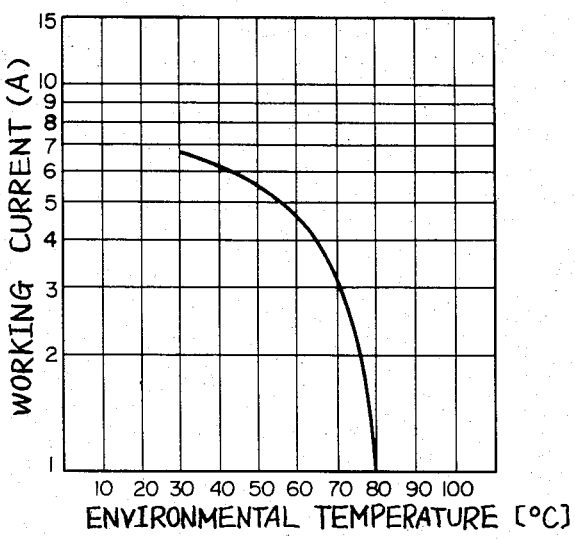
FIG. 6 is a graph showing the working current versus environmental temperature characteristic of the breaker shown in FIGS. 4 and 5.
Figure 7:
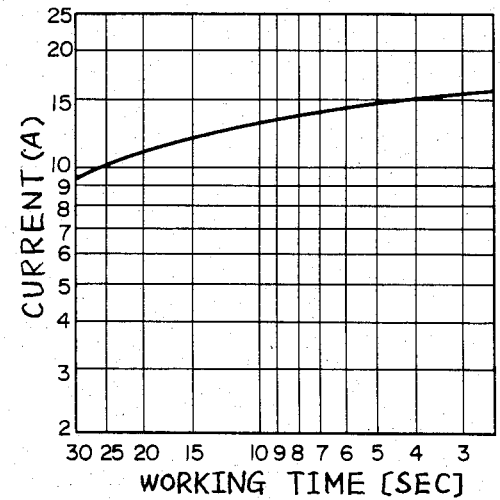
FIG. 7 is a graph showing the current versus working time characteristic of the breaker shown in FIGS. 4 and 5.

Characteristics of the breaker 15 described above are shown in FIGS. 6 and 7. FIG. 6 is a graph showing the working temperature of the breaker 15 versus the ambient temperature. FIG. 7 is a graph showing the working time of the breaker 15 versus an ambient temperature of 25° C. During charging with 2.0 A with the connector connected to a charger (not shown), if overcharge occurs, the battery temperature abnormally rises. The breaker 15 detects this temperature and, as shown in FIG. 6, if the temperature reaches 75° C., the breaker 15 opens, cutting off the charging circuit. When the temperature falls below 75° C., the breaker 15 closes again. If the lead wires 8 and 9 are shorted, a large current, e.g., 120 A, will flow through this circuit. Since this exceeds to a large extent the current range shown in FIG. 7, the breaker 15 instantaneously opens. In this case also, when the short is removed, the breaker 15 closes again.

As for the breaker 15, it is not limited to the characteristics shown in FIGS. 6 and 7. For example, it may have characteristics which can be obtained by parallel displacement of the characteristics shown in FIGS. 6 and 7. In brief, characteristics may be selected by considering the secondary batteries and charging and discharging currents.

FIGS. 8 through 14 show another embodiment of the invention. The battery device shown therein is arranged so that by simply inserting it into a battery receiving section provided in a portable appliance, such as portable VTR (video tape recorder), desired electric connection is attained and the positioning of the battery device itself is also attained. More particularly, as shown in FIG. 10, terminal elements 25, 26 and 27 are installed to extend along the outer surface of a case 28 such that they are exposed. The case 28 comprises an upper case member 29 and a lower case member 30 which are rigidly fixed together. The upper and lower case members 29 and 30, as in the embodiment in FIG. 2, are preferably made of hardly flammable and shock-resistant synthetic resin, e.g., hardly-flammable ABS resin. Preferably, the upper and lower case members 29 and 30 are welded together by an ultrasonic wave. Making it unnecessary to use fixing means, such as screws, this advantageously prevents the case from becoming bulky due to screw-receiving portions which would otherwise have to be provided. The terminal elements 25, 26 and 27 are arranged along one side of the rectangular bottom surface of the lower case member 30. The lower case member 30 is formed with grooves 31 for positioning the battery device with respect to a battery receiving part, not shown, such as a portable appliance or charging device.

Figure 8:
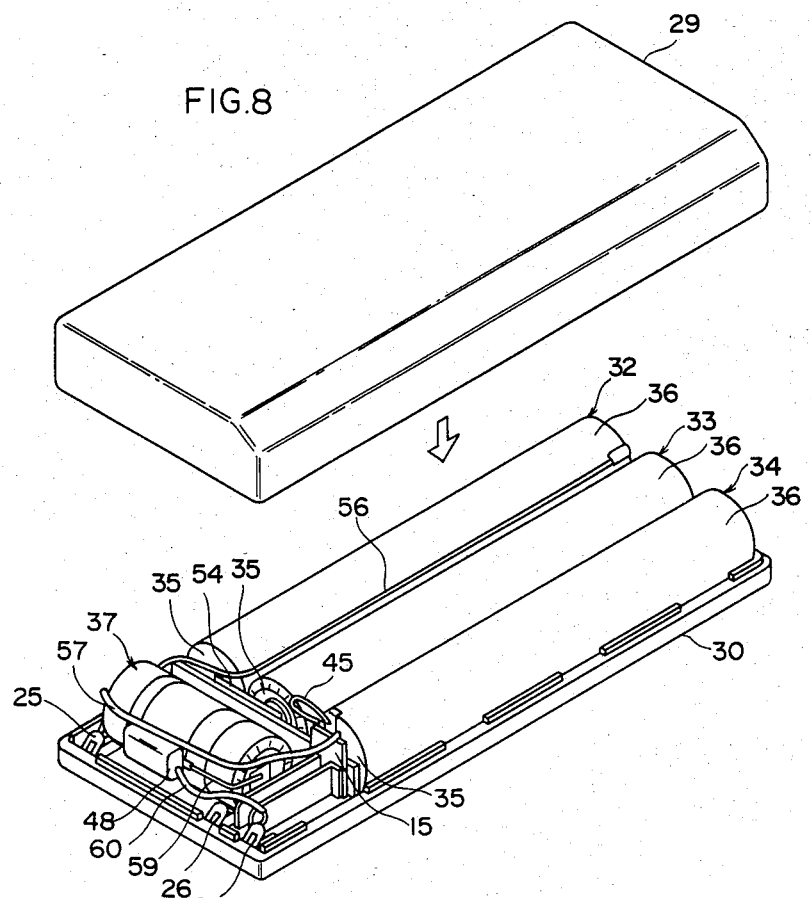
FIG. 8 is a perspective view of another embodiment of the invention, shown with an upper case member separated from a lower case member.
Figure 9:
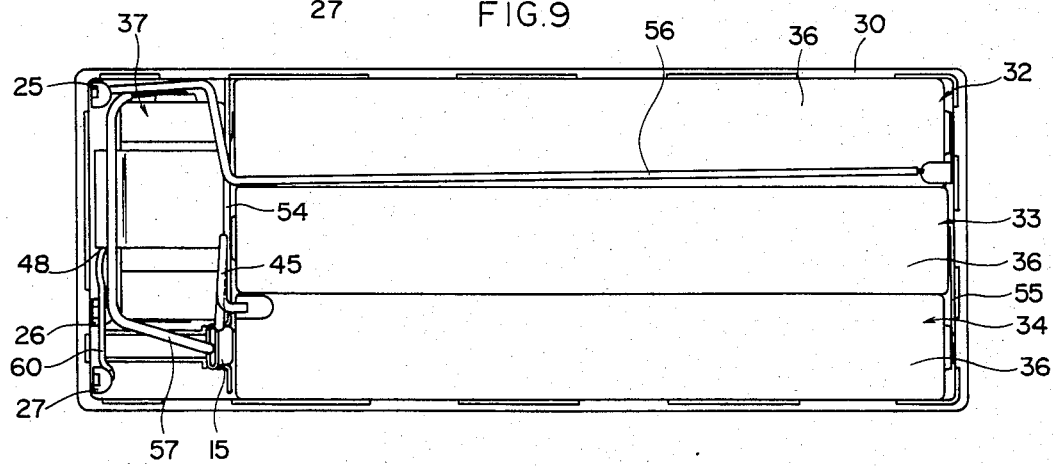
FIG. 9 is a plan view showing components received in the lower case member of FIG. 8.

As is clear from FIGS. 8 and 9, the components are arranged in the case 28 such that there is almost no wasteful space left therein. This means that the size of the case 28 can be reduced. The fact that the upper and lower case members 29 and 30 can be formed relatively thin-walled contributes to the reduction of the size of the case 28. This can be easily attained by using a shock-resistant material, as described above. The arrangement of the components in the case 28 will now be described in more detail.

Three battery assemblies 32, 33 and 34 each comprise 3 unit batteries 35. The 3 unit batteries 35 in each assembly are connected in series and inserted in a paper tube 36, whereby they are mechanically integrated together. The battery assemblies 32, 33 and 34 are arranged side by side in contact with each other. A single unit battery 37 is disposed to extend at right angles to the 3 lines of battery assemblies 32, 33 and 34. As best shown in FIG. 9, the total of the diameters of the battery assemblies 32, 33 and 34 is approximately equal to three times the diameter of the unit battery 37 and is greater than the height, i.e., axial length of the unit battery 37. Therefore, 3 regions are defined on the rectangular lower case member 30, i.e., a first region in which the 3 battery assemblies 32, 33 and 34 are disposed, a second region in which the unit battery 37 is disposed, and a third region with its two sides adjoining said first and second regions. The third region is utilized to arrange a self-restoring breaker 15 which is characteristic of the invention. The breaker 15 is the same as that described with reference to FIGS. 4 and 5.

Referring to FIG. 12, the breaker 15 is positioned and retained by 4 guide ribs 38, 39, 40 and 41 formed on the lower case member 30. The guide ribs 38 and 39 are symmetrical with respect to each other and adapted to fit in corners defined by the curled portion 42 at the end of the metal can 17 and the gasket 19. The guide ribs 40 and 41 are symmetrical with respect to each other and adapted to fit in corners defined by the lateral surface 43 of the bulgy portion and the outer surface 44 of the flat portion of the metal can 17. Thus, by simply inserting the breaker from above into the space defined by the guide ribs 38, 39, 40 and 41, the breaker 15 can be fixed at a predetermined position on the lower case member 30. The position of the breaker 15 is selected so that it is adjacent to the unit battery 35. This is for the purpose of enabling the breaker 15 to detect temperature more quickly. In this sense, the metal can 17 of the breaker 15 may be brought very close to the unit battery 35 or in touch therewith. As will become clear from the wiring diagram to be later described, since the lead wire 45 connected to terminal 23 (FIG. 4) formed on the metal can 17 is to be connected to the anode of the unit battery 35 included in the battery assembly 34, the contact of the metal can 17 with the sheath of the unit battery 35 presents no electrical problem. In addition, the case 28 is of closed construction. Therefore, there is no need of deliberately positioning the breaker 15 close to the unit battery, since the temperature condition in the closed case 28 will become uniform in a relatively short time.

Referring to FIG. 13, a unit battery shown at left in FIGS. 8 and 9 is singled out at 37. The sheath 46 of the unit battery 37 is covered with paper tubes 47 for insulation purposes, with part of the sheath 46 exposed. A thermostat 48 is mounted on the exposed portion. The thermostat 48 is preferably urged against and fixed on the sheath 46 by a thermoconductive tape-like member 49, such as an aluminum tape, wound around the sheath 46. Thus, the thermostat 48 detects the temperature of the unit battery 37 substantially throughout the surface of the thermostat, ensuring temperature detection with high accuracy almost without being influenced by the ambient temperature.

The cut-off set temperature for the thermostat 48 is selected so that it is lower than the temperature at which the breaker 15 is cut off with respect to the environmental temperature. This temperature is, e.g., 45°±4° C. The thermostat 48 is for charge control purposes, being used to detect heat generation in the final stage of the charging of the unit battery 37 so as to cut off the charging current.

It is to be noted that the breaker 15 and the thermostat 48 are disposed at separate positions in the case 28, as best shown in FIGS. 8 and 9. This provides for dual safety for this battery device for the following reasons: The thermostat 48 is absolutely for charge control purposes, while the breaker 15 is for battery protection purposes. If the breaker 15 and the thermostat 48 were installed in connection with the same unit battery, they would become unable to operate normally should a failure happen in the above described same unit battery, thus leading to a serious accident. In contrast, if the breaker 15 is installed in connection with the unit battery 35 included in the battery assembly 34 different from the unit battery 37 with which the thermostat 48 is associated, as shown, then should a failure happen in one unit battery 37, at least the breaker operates normally, thus precluding accidents. Herein lies the significance of the breaker 15 as a battery protective part.

Referring to FIG. 14, the manner of attaching the terminal element 25 is shown. The lower case member 30 is formed with two slits 50 and 51. Pawls 52 and 53 formed on the terminal element 25 are inserted in the slits 50 and 51 and then bent, whereby the terminal element 25 is attached to the lower case member 30. What is to be noted here is that one slit 50 is relatively large. This slit 50 allows passage of gas in the internal space of the case 28 even when the lower case member 30 is fixed to the upper case member 29. The unit batteries received in the case 28 are each provided with a safety valve for discharging abnormal high pressure in the battery when the overcharged state is reached when the thermostat 48 is out of order. The gas discharged through these safety valves collects in the case 28. Thus, if the case 28 is of hermetically sealed construction, the pressure in the case 28 will abnormally rise, possibly causing deformation of the case 28. To avoid this, the slit 50 advantageously serves as a ventilation hole. In addition, it is not absolutely necessary to provide such ventilation hole at the terminal element attaching portion but an exclusive ventilation hole may be provided at any other place. Though not specifically described, the terminal elements 26 and 27 are of the same construction as the terminal element 25.

Referring to FIG. 8, the lower case member 30 is much shallower than the upper case member 29, so that with the upper case member 29 removed, the components disposed on the lower case member 30 are accessible also laterally. This means that soldering and other operations can be easily performed in such a condition that the components are disposed on the lower case member 30. Thus, improved processability can be expected.

FIG. 11 shows an electric wiring diagram for the embodiment being described. In FIGS. 8, etc., also, like reference numerals are given to like parts in cases where components corresponding to those shown in the electric wiring diagram appear. The battery assemblies 32, 33 and 34 each comprise 3 unit batteries 5 connected in series. The battery assemblies 32, 33 and 34 are interconnected by connector plates 54 and 55. In this way, 9 unit batteries 35 are connected in series. The cathode of the unit battery 35 at one extreme end of this 9-series arrangement is connected to the terminal element 25 through a lead wire 56. On the other hand, the anode of the unit battery 35 at the other extreme end of said 9-series arrangement is connected to one terminal of the breaker 15 through the lead wire 45. The other terminal of the breaker 15 is connected to the cathode of one unit battery 37 through a lead wire 57. A lead wire 58 is connected to the anode of this unit battery 37, said lead wire 58 being connected to the terminal element 26. Further, the anode of the unit battery 37 is connected to one terminal of the thermostat 48 through a lead wire 59, and the other terminal of the thermostat 48 is connected to the terminal element 27 through a lead wire 60.

As best shown in FIG. 11, a battery device comprising 10 unit batteries 35 and 37 connected in series is obtained. The charging and discharging of the batteries are effected through the terminal elements 25 and 26. If the breaker 15 is cut off for one reason or another, the charge-discharge circuit is cut off, stopping the charging or discharging operation. The terminal element 27 is connected to a predetermined terminal of a charging device (not shown) to control the charging device. So long as the terminal element 27 is maintained at a predetermined potential, it continues to turn on the switching element of the charging device. Therefore, when the thermostat 48 is cut off, the switching element is turned off, so that the charging current is not fed to the terminal elements 25 and 26. In addition, depending upon the type of the charging device, the charging of the unit batteries 35 and 37 is possible even if charging current is fed through the terminal elements 25 and 27. The charging current can be cut off by the cut-off of the thermostat 48.

FIGS. 8 and 9 show a plurality of ribs for positioning the components received in the case 28 and positioning the upper case member 29 with respect to the lower case member 30. Such ribs may be suitably changed according to the arrangement of the components.

From the standpoint of reducing the overcharge period to prevent degradation of this kind of secondary batteries, it is preferable for the thermostat to detect the termination of charging of the batteries as quickly as possible and cut off the charging current as quickly as possible. To this end, it is preferable that at least the unit battery 37 from which heat is transmitted to the thermostat 48 have a higher rate of heat generation in the final stage of charging. A concrete example of an arrangement which meets such requirement is shown in FIG. 15. FIG. 15 illustrates the cross-section of a spiral electrode arrangement for a battery. Referring to FIG. 15, generally, in a sealed type secondary battery, a cathode sheet 61 and an anode sheet 62 are spirally wound with a separator 63 interposed therebetween. This battery is characterized in that the anode-cathode capacity ratio is much larger than that of the ordinary nickel cadmium battery and in that the electrode sheets are thinner and longer than the ordinary nickel cadmium battery. As a result, the area of the opposed electrode sheets is large. As another feature of the battery, an auxiliary separator 64 shown colored black in FIG. 15 is provided in the central region, extending a certain length along the main separator 63. The region where this auxiliary separator is formed is preferably within the range of 20-60% of the main separator 63. The presence of the auxiliary separator 64 impedes the penetration of oxygen which is produced during overcharge. In addition, instead of providing such auxiliary separator 64, the perforations in the particular region of the main separator 63 may be filled up by heating. This kind of battery will be heated by the heat which is produced when the anode sheet 62 absorbs oxygen which is produced during overcharge. Accordingly, the oxygen produced during overcharge does not so much penetrate the portion where the auxiliary separator 64 is formed, collecting in the separators 63 and 64 to form a resistor which reduces the current density in the central region of the spiral electrode arrangement. On the other hand, in the outer peripheral portion of the spiral electrode arrangement, the gas penetration is satisfactory and the current density is increased by the amount it is reduced in the central region. That is, when the overcharge state is reached starting to produce gas, the current density is concentrated in the outer peripheral region, where, therefore, production and absorption of much gas take place, giving a sharp rise in temperature. In other words, the temperature of the portion of the battery nearer to the sheath which is to be detected by the thermostat 48 rises sharply and hence the surface temperature of the sheath also rises sharply, with the result that the thermostat responds thereto quickly, thus reducing the time which lapses after completion of charging. In addition, such special battery shown in FIG. 15 should preferably be used not only for the unit battery 37 but also for other batteries 35 in order to uniform the charging and discharging characteristics.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A battery device adapted to receive current from a source of charging current, said charging current source including means for varying said charging current, comprising:

an outer case comprised of a first case member and a second case member fixed together defining a space therebetween;

a secondary battery including first and second unit batteries disposed in said space, at least said second unit battery comprising a sealed nickel cadmium battery having a cathode sheet, an anode sheet and a separator sheet interposed between said cathode and anode sheets, said separator, cathode and anode sheets being spirally sound, said second unit battery further comprising oxygen penetration impeding means disposed in a central region of a cross-section of said spirally wound cathode, anode and separator sheets, for impeding oxygen penetration, whereby said second unit battery has a high rate of heat generation in a final stage of battery charging;

a charge-discharge circuit disposed in said space including first and second terminals for receiving said charging current for said secondary battery and for receiving discharging current from said secondary battery;

said charge-discharge circuit including a self-restoring breaker retained by said second case member and disposed adjacent said first unit battery, said breaker serving to detect current in said charge-discharge circuit and the environmental temperature in said case, having a switching characteristic responsive to said current and said environmental temperature, said switching characteristic being selected so that said breaker is cut off in at least one of the conditions where said current exceeds a predetermined value or where said environmental temperature exceeds a predetermined temperature lower than the temperature at which material of said outer case loses its configurational stability;

control terminal means for providing a control signal to said charging current source varying means for controlling said varying means; and a thermostat disposed adjacent said second unit battery coupled to said secondary battery and coupled between said second and said control terminal means wherein a cut-off temperature of said thermostat corresponds to heat generated in a final stage of charging of said secondary battery and said cut-off temperature is lower than said self-restoring breaker cut-off temperature.

2. A battery device as set forth in claim 1, wherein said case is comprised of substantially non-flammable, shock-resistant synthetic resin.

3. A battery device as set forth in claim 1, wherein said first and second therefor case members each have a bottom wall and a lateral wall upwardly extending from said bottom wall, and the lateral wall of said first case member is higher than that of said second case member.

4. A battery device as set forth in claim 1, wherein said first and second terminals include lead wires extending outside the case and having a connector at front ends thereof.

5. A battery device as set forth in claim 1, wherein said first and second terminals include a plurality of terminal elements extending along the outer surface of said case and exposed.

6. A battery device as set forth in claim 5, wherein said case is substantially rectangular parallelepiped, and said terminal elements are arranged along one side of the bottom wall of the second case member.

7. A battery device as set forth in claim 1, wherein said case is formed with a ventilation hole and is closed except for said ventilation hole.

8. A battery device as set forth in claim 1, wherein said secondary battery includes a plurality of unit batteries, said plurality of unit batteries being arranged flatways in the case, said case being substantially rectangular parallelepiped, said case having three regions defined therein, a first region in which said plurality of unit batteries are arranged in a plurality of juxtaposed rows in contact with each other, a second region in which a single unit battery is arranged at right angles to the unit batteries in said plurality of rows, and a third region whose two sides adjoin said first and second regions, said breaker being disposed in said third region.

9. A battery device as set forth in claim 1, wherein said thermostat is fixed in position by being urged against the sheath of the secondary battery by a thermoconductive tape-like member wound around the sheath of said secondary battery.

10. A battery device as set forth in claim 1, wherein said breaker includes a switch contact held by a bimetal which generates head when a current is passed therethrough.

11. The battery device according to claim 1 wherein said varying means comprises a switch for switchably coupling said charging current to said battery device.

12. The battery device according to claim 1 wherein said oxygen penetration impeding means comprises an auxilliary separator disposed to cover from 20% to 60% of said separator means.

13. The battery device according to claim 1 wherein said first unit battery comprises a sealed nickel cadmium battery having a cathode sheet, an anode sheet and a separator sheet interposed between said cathode and anode sheets, said separator, cathode and anode sheets being spirally wound, said second unit battery further comprising oxygen penetration impeding means disposed in a central region of a cross-section of said spirally wound cathode, anode and separator sheets, for impeding oxygen penetration.

14. The battery device according to claim 1 wherein said first and second unit batteries are disposed in said defined space and positioned by said second case member and said charge discharge circuit is retained by said second case member.

15. The battery device according to claim 1 wherein said breaker is electrically coupled between said first terminal and a junction of said second terminal and said thermostat.

16. The battery device according to claim 15 wherein said breaker is electrically coupled between said second terminal and a junction of said thermostat and said secondary battery.

* * * * *